J. SAVOIE.
FRAMELESS SPECTACLES.
APPLICATION FILED APR. 5, 1909.
926,293.
Patented June 29, 1909.
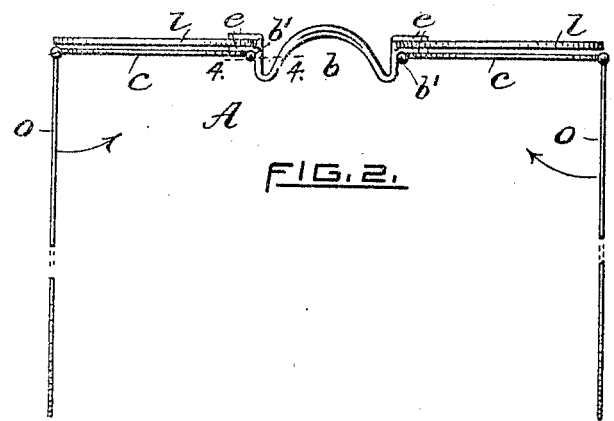
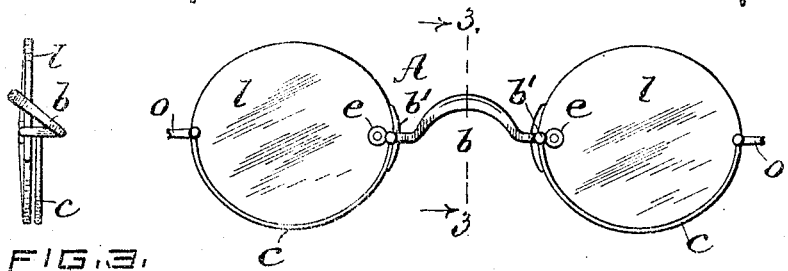
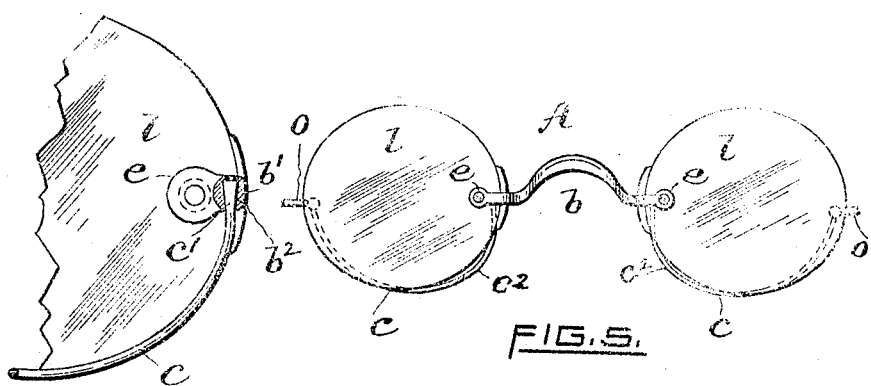
WITNESSES:
INVENTOR:
Joseph Savoie.
By Geo. H. Remington
Atty.

UNITED STATES PATENT OFFICE.

JOSEPH SAVOIE, OF CENTRAL FALLS, RHODE ISLAND, ASSIGNOR OF ONE-FOURTH TO EDWARD C. GLINES, OF PROVIDENCE, RHODE ISLAND, AND ONE-FOURTH TO NAPOLEON HERBERT, OF CENTRAL FALLS, RHODE ISLAND.

FRAMELESS SPECTACLES.

No. 926,293.  Specification of Letters Patent.  Patented June 29, 1909.

Application filed April 5, 1909. Serial No. 488,101.

*To all whom it may concern:*

Be it known that I, JOSEPH SAVOIE, a subject of the King of Great Britain, residing at Central Falls, in the county of Providence and State of Rhode Island, have invented certain new and useful Improvements in Frameless Spectacles, of which the following is a specification.

In a patent of the United States, granted to me March 16th, 1909, No. 915,487, on frameless spectacles, certain features of construction are set forth and claimed.

My present invention has relation to spectacles of the character referred to and it consists in the novel manner of positioning the temple-holding-wires, so-called, and also in the manner of securing the latter to the nose-piece or bridge, as more particularly hereinafter set forth and claimed.

In said patented spectacles the bows are jointed respectively to the free ends of bendable oppositely disposed holding-wires extending around the upper portion of but disconnected from the lenses, and fixed to the rear ends of the bridge member. In my present invention I also employ wire members, these, however, are each rigidly secured to the bridge at a point immediately back of the lens and bent to conform closely to and being coincident or parallel with the periphery of the lower half of the lens.

An objection to spectacles as usually devised is that they are unprovided with means whereby when desired they may be readily adapted to be supported by the sides of the wearer's nose instead of resting on the bridge part. That is to say, in case the bridge of the nose becomes sore or irritated from any cause, as for instance as sometimes happens by supporting spectacles thereon. In spectacles embodying my improvement herewith provision is made so that they may may be readily adjusted to relieve the weight or pressure of the spectacles normally borne by the bridge of the nose thereby adapting the spectacles to be supported by the sides of the nose.

In the accompanying drawing, Figure 1 represents a back elevation of a pair of frameless spectacles embodying my improvement, the temple-bows being broken away. Fig. 2 is a corresponding top plan view, including the temple-bows. Fig. 3 is an end view corresponding with a section taken on line 3 3 of Fig. 2. Fig. 4 is a transverse sectional view on an enlarged scale, taken on line 4 4 of Fig. 2, and Fig. 5 is a front view, showing how the wires may be bent so that the spectacles are adapted to be supported by the sides of the nose.

I would state here that the rimless lenses and the bridge or connecting member employed may be constructed substantially as usual, except that the bridge-piece is adapted to have the bent wire members $c$ secured thereto.

In my improved spectacles A the two lens members 1 are connected by means of the interposed bridge or nose-piece $b$ in the usual manner. At a point $b^1$ immediately back of the ears $e$, and also contiguous to the inner end of the corresponding lens, the bridge is slightly enlarged and taper-drilled, at $b^2$, Fig. 4, to receive and hold the corresponding end of its wire member $c$. The said end portion of the wire is flattened to a wedge form, $c^1$, to fit opposite sides of said hole. After the end portion $c^1$ is inserted the surrounding metal is pressed or swaged snugly around and over the top end thereby rigidly securing the wire in position and preventing any movement whatever thereof.

The wire members, $c$, consist each of a piece of thin, light, resilient and bendable stock having its inner end secured to the bridge-piece $b$ as just described, its outer or free end being jointed to a temple-bow $o$. The latter are bent and adapted to pass over and back of the ears of the wearer and also adapted to be folded inwardly flatwise when not in use so as to be inserted in a case. The wire $c$ lies comparatively close to the back of the lens (see Figs. 2 and 3) and is bent normally concentric or parallel with the edge of the lower half of it, as shown clearly in Figs. 1 and 4. As thus devised and constructed it will be observed that the wires, $c$, are inconspicuous, and in fact when in use they are scarcely noticeable from the front side.

My improved rimless or frameless spectacles present a neat, light, and attractive appearance; they are comparatively inexpensive to manufacture, and the liability of breaking the lenses is reduced to a minimum. In case it becomes necessary or desirable, for any reason, to support the spectacles on the sides of the nose instead of resting on its bridge the wires may be readily bent at $c^2$ for the purpose, substantially as shown in Fig. 5. That is to say, the normal distance between the wires $c$ is correspondingly contracted thereby causing or adapting the spectacles to be supported on the sides of the nose; as stated $c^2$ indicates the contacting points, the result being to slightly elevate the spectacles from the former or normal position wherein the member $b$ rested directly on the bridge of the nose.

What I claim as my improvement and desire to secure by United States Letters Patent, is:—

1. As an improved article of manufacture, frameless spectacles having their two lenses united at their inner ends by a nose-piece or bridge, a pair of oppositely disposed bendable resilient wire members secured to the nose-piece, temple-bows jointed to the outer or free ends of said wire members, and having each of the latter normally bent to conform to and lie parallel with the perimeter of the lower half of the lens and located at the back of and closely adjacent the lens, substantially as described.

2. In a pair of frameless spectacles, the combination with the lenses and nose-piece, of a pair of bent oppositely disposed resilient wire members secured to the nose-piece and extending downward therefrom in a curved form substantially parallel and coincident with the lower edge portion of the lenses and located at the back of but disconnected from them, and temple-bows jointed to the free ends of the wire members.

3. In frameless spectacles, a pair of oppositely disposed resilient wire members secured to the nose-piece or bridge, each wire member being located at the back of its lens and lying normally concentric with its lower edge, means connected with the free ends of said wire members for holding the spectacles in position when in use, the wire members adapted to be bent so as to rest on the sides of the nose, for the purpose hereinbefore set forth.

4. In frameless spectacles of the character described, the combination with the nose-piece provided with a taper-hole located at the back of the lens, of a bent resilient wire member having an end thereof fitted in said hole and secured therein against axial movement.

5. In frameless spectacles, the combination of the nose-piece having a member thereof provided with a taper-shaped hole, a bent resilient wire member having an end thereof flattened and rigidly secured in said hole, and a temple-bow connected to the other end of said wire.

In testimony whereof I have affixed my signature, in presence of two witnesses.

JOSEPH SAVOIE.

Witnesses:
E. C. GLINES,
GEORGE H. REMINGTON.